March 23, 1954
C. R. BROWN
2,672,727
FUEL VAPORIZER SYSTEM FOR COMBUSTION CHAMBERS
Filed May 31, 1951
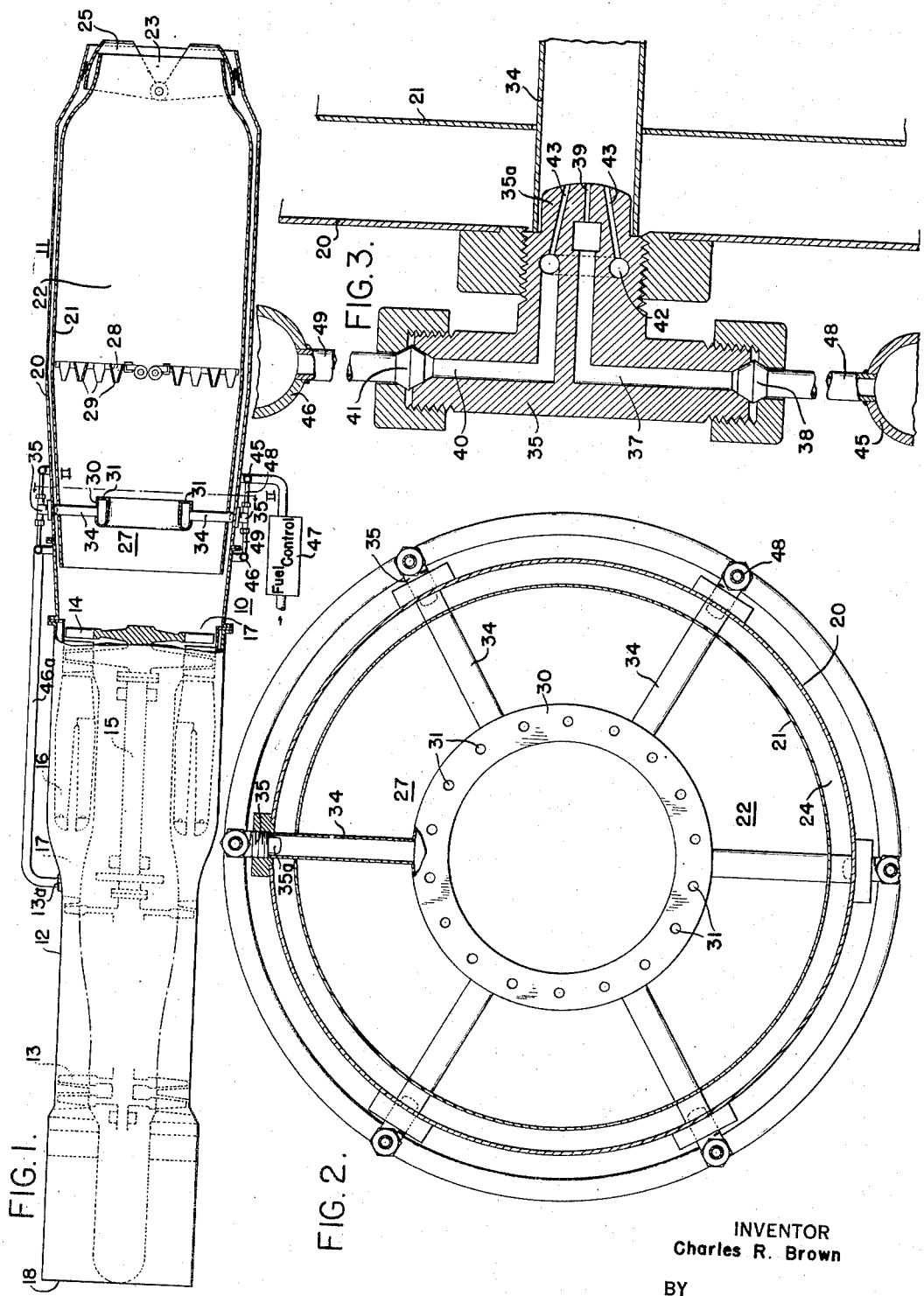
INVENTOR
Charles R. Brown
BY
Ralph T. French
ATTORNEY Patented Mar. 23, 1954

2,672,727

UNITED STATES PATENT OFFICE 2,672,727

FUEL VAPORIZER SYSTEM FOR COMBUSTION CHAMBERS

Charles R. Brown, Glen Mills, Pa., assignor to Westinghouse Electric Corporation, East Pittsburgh, Pa., a corporation of Pennsylvania Application May 31, 1951, Serial No. 229,123

4 Claims. (Cl. 60—35.6)

This invention relates to combustion apparatus and, more particularly to afterburner apparatus for an aviation jet power plant.

It has been determined that substantial gains in afterburner performance could be achieved if afterburner fuel could be thoroughly mixed with a proportionate amount of air and then vaporized before the fuel and air mixture reaches the usual flameholder elements. It is an object of the invention to provide improved vaporizer means for an afterburner having features of construction adapted to render available the above performance characteristics.

Another object of the invention is the provision of afterburner apparatus including fuel atomizing means operative to effect substantially complete combustion of the afterburner fuel for ensuring maximum thrust augmentation.

A further object of the invention is to provide means for effecting local preliminary mixture of afterburner fuel and sufficient air tapped from the compressor to facilitate vaporization of the fuel prior to injection of the mixture into the afterburner combustion chamber.

These and other objects are effected by the invention as will be apparent from the following description and claims taken in connection with the accompanying drawing, forming a part of this application, in which:

Fig. 1 is a longitudinal diagrammatic view, partly in section, of an aviation turbojet engine equipped with afterburner apparatus constructed in accordance with the invention;

Fig. 2 is an enlarged detail sectional view taken along the plane II—II of Fig. 1; and Fig. 3 is an enlarged detail sectional view of one of the vaporizer fittings shown in Fig. 2.

Referring to Fig. 1 of the drawing, the power plant therein illustrated comprises a gas turbine engine 10 which is equipped with thrust augmenter or afterburner apparatus 11. The engine 10 may be of any suitable construction, and is diagrammatically shown as including a generally cylindrical casing structure 12 housing an axial-flow compressor 13, a turbine 14 drivingly connected thereto through the medium of an axial shaft 15, and annular combustion apparatus 16 which is interposed between the compressor and the turbine. An axial-flow annular communication 17 extends through the engine 10 from a frontal air inlet opening 18 to the discharge side of the turbine 14.

The afterburner 11 comprises a tubular envelope or casing 20, the forward end of which is suitably secured to the discharge end of the engine casing structure 12, and which carries a combustor liner 21 forming a combustion chamber 22 that communicates with the engine axial-flow passage 17 and with a rearwardly disposed discharge nozzle 23. An outer annular passage 24 is formed between the liner 21 and outer casing 20. Suitable apparatus 25 may be provided for controlling the flow area of the nozzle 23.

In operation of the power plant apparatus already described, air entering the inlet opening 18 is compressed by the compressor 13 and delivered by way of passage 17 to the combustion apparatus 16 for supporting combustion of fuel that is metered thereto by suitable means, not shown. The resultant heated gases are expanded through the turbine 14, which utilizes sufficient energy from the gases to drive the compressor. From the turbine discharge portion of passage 17 the gases and residual air are conducted through the afterburner 11, wherein additional fuel may be burned, in a manner hereinafter described, to augment the propulsive thrust of the gases at the nozzle 23.

According to the invention, the afterburner combustion chamber 22 is supplied with fuel through the medium of a fuel vaporizer assembly, generally indicated at 27, which is supported within the afterburner envelope 20 in the upstream portion of the combustion chamber. A flameholder structure 28 is preferably provided in the combustion chamber downstream of the assembly 27. Such a flameholder may be of any suitable construction, and as illustrated may comprise spaced concentric groups of arcuate V-shaped members 29, which are adapted to effect sufficient local stagnation or eddy effects in the gas stream to retain the afterburner flame in the desired region of the combustion chamber 22. It should be understood that, while in the illustrated form of the invention a separate flameholder is provided, the vaporizer assembly 27 might be designed to serve as a flame anchor, in which case the structure 28 could be omitted.

The fuel vaporizer assembly 27 includes an annular vaporizer or distributor manifold 30 having a plurality of circumferentially spaced outlet openings 31 which communicate with the combustion chamber 22 at points just upstream of the flameholder structure 28. Connected to the distributor manifold 30 at equally spaced points about its periphery are a plurality of radially extending tubes 34, the outer open ends of which extend through openings in the liner 21 and are suitably attached to the casing 20 for receiving nozzle portions 35a of a corresponding number of fuel and air fittings 35. As shown in Fig. 3, each of these fittings comprises a T-shaped body having a fuel supply passage 37 with an inlet 38 and terminating in a central discharge orifice 39, formed in the nozzle portion 35a. Each fitting 35 also has an air supply passage 40 which leads from an inlet 41 to an annular chamber 42 communicating with a plurality of discharge orifices 43, that are grouped circumferentially about the central fuel orifice 39.

The vaporizer assembly further includes annular fuel and air manifolds 45 and 46, respectively, which are mounted on the afterburner casing 20 adjacent the fittings 35. The fuel manifold 45 is adapted to be supplied with fuel which may be metered by operation of an afterburner fuel control equipment 47 of suitable construction, and is connected to the inlets 38 of the respective fittings 35 by way of branch conduits 48. The air manifold 46 is connected by way of a conduit 46a with a compressed air tap or discharge port 13a disposed at a suitable point in the casing surrounding the compressor 13. A plurality of branch conduits 49 are provided for connecting the air manifold to the respective air inlets 41 of the fittings 35.

In operation, air under pressure tapped from the compressor 13 flows through conduit 46a and air manifold 46 to the passages 40 of each of the fittings, from which the air is discharged by way of the respective orifices 43. At the same time, fuel supplied to the manifold 45 by the usual operation of the afterburner fuel control apparatus 47, flows through the conduits 48, passages 37 and orifices 39 into the path of compressed air issuing from the associated orifices 43 of the respective fittings, and the fuel spray and air are then thoroughly mixed during traverse through the tubes 34 to the distributor or vaporizer manifold 30. Preferably, the mixture of fuel and air thus supplied by way of the fittings 35 is quite rich, and may be on the order of a one-to-one ratio under certain operative conditions. The heat of the turbine exhaust gases flowing past the distributor manifold 30 is effective to vaporize the fuel therein, so that complete and efficient combustion will be maintained upon discharge of the air and vaporized fuel mixture through the openings 31 toward the flameholder structure 23 within the afterburner combustion zone or chamber 22.

It will be apparent from the foregoing that the fuel and air fittings 35 are adapted to effect efficient premixture of fuel and air at points sufficiently remote from the combustion zone to prevent coking within the confines of each fitting, and that the relatively large passages provided in the radial tubes 34 and distributor manifold 30 will serve to facilitate preheating and vaporization of the fuel while conducting the mixture of fuel and air rapidly to the combustion chamber.

While the invention has been shown in but one form, it will be obvious to those skilled in the art that it is not so limited, but is susceptible of various changes and modifications without departing from the spirit thereof.

What is claimed is:

1. In combustion apparatus for a gas motivated power plant, a tubular casing structure adapted for flow therethrough of a hot gas stream including combustion products from the power plant and sufficient air to support combustion, said casing structure defining a combustion chamber, a separate air supply passage disposed exteriorly of said combustion chamber, an apertured vaporizing manifold mounted in said casing structure near the upstream end of said combustion chamber and in the path of the hot gas stream, a plurality of circumferentially spaced fuel and air mixing devices mounted in said tubular casing structure outwardly of said combustion chamber, each of said mixing devices having a fuel inlet, an air inlet, and adjacent cooperating fuel and air discharge orifices, means connecting said air inlets to said separate air passage, and a plurality of radially disposed conduits connecting said discharge orifices of the respective mixing devices to said vaporizing manifold.

2. In combustion apparatus for a gas motivated power plant having a compressor with a discharge outlet, the combination of a tubular casing structure adapted for flow therethrough of a hot gas stream including combustion products from the power plant and sufficient air to support combustion, said casing structure defining a combustion chamber, a separate air passage formed exteriorly of said combustion chamber and connected to the discharge outlet of said compressor, an apertured vaporizing manifold mounted in said casing structure near the upstream end of said combustion chamber and in the path of the hot gas stream, a plurality of circumferentially spaced fuel and air mixing devices mounted in said casing outwardly of said combustion chamber, each of said mixing devices having a fuel inlet, an air inlet, and adjacent cooperating fuel and air discharge orifices, a plurality of radially disposed conduits connecting said discharge orifices of the respective mixing devices to said vaporizing manifold, fuel supply means connected to said fuel inlets of the mixing devices, and means connecting said separate air passage to the respective air inlets for supplying air under pressure from said compressor to said air inlets of said mixing devices.

3. Apparatus as set forth in claim 2, including a flameholder structure disposed in the combustion chamber downstream of the apertured vaporizing manifold in the path of the vaporized fuel and air mixture discharged thereby.

4. Afterburner apparatus for an aviation gas turbine power plant having a compressor, said afterburner apparatus comprising cylindrical casing structure terminating in a jet nozzle and having a combustion chamber for conducting hot gases and residual air discharged by the gas turbine to the nozzle, flameholder structure mounted in said combustion chamber, a plurality of spaced fuel and air mixing devices disposed circumferentially about said casing structure outwardly of said combustion chamber, each of said mixing devices having an air passage terminating in an orifice and a fuel passage terminating in an orifice adjacent the first-named orifice, means for supplying air under pressure from said compressor to the air passage of each of said mixing devices, fuel control means for supplying fuel to the fuel passage of each of said mixing devices, and vaporizer manifold structure mounted in said casing structure in the path of hot gases upstream of said flameholder structure, said manifold structure having discharge openings communicating with said combustion chamber and a plurality of inlet portions connected to said fuel and air orifices of the respective mixing devices.

CHARLES R. BROWN.

References Cited in the file of this patent

UNITED STATES PATENTS

| Number | Name | Date |
| --- | --- | --- |
| 2,404,335 | Whittle | July 16, 1946 |
| 2,508,420 | Redding | May 23, 1950 |
| 2,522,081 | Allen | Sept. 12, 1950 |
| 2,536,600 | Goddard | Jan. 2, 1951 |
| 2,541,108 | Sforzini | Feb. 13, 1951 |
| 2,548,087 | Williams | Apr. 10, 1951 |
| 2,552,851 | Gist | May 15, 1951 |
| 2,560,401 | Allen | July 10, 1951 |
| 2,583,416 | Clarke | Jan. 22, 1952 |